July 6, 1948.  J. H. RICHARDSON  2,444,532
METHOD OF MANUFACTURING REFLECTING
OPTICAL ELEMENTS
Filed March 7, 1946
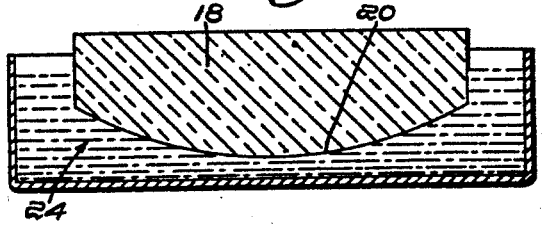
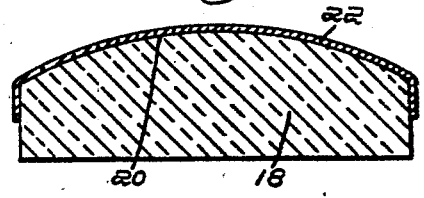
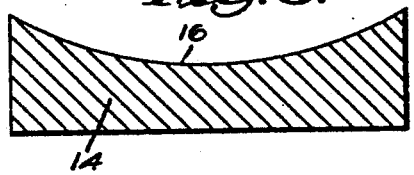
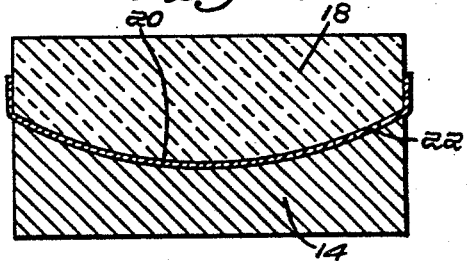
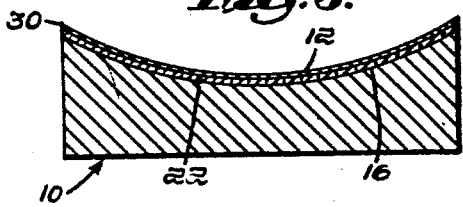
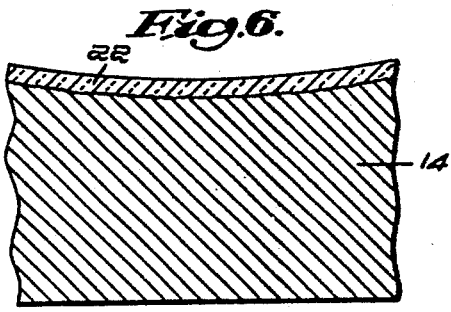
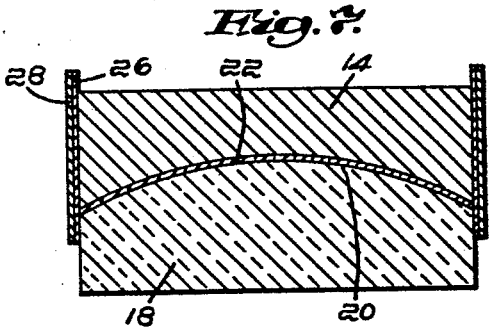
Inventor:
John H. Richardson
By Donald L. Brown
Attorney Patented July 6, 1948

2,444,532

UNITED STATES PATENT OFFICE 2,444,532

METHOD OF MANUFACTURING REFLECTING OPTICAL ELEMENTS

John H. Richardson, Needham, Mass., assignor to Polaroid Corporation, Cambridge, Mass., a corporation of Delaware Application March 7, 1946, Serial No. 652,831

11 Claims. (Cl. 18—59)

The present invention relates generally to improved methods of forming optical elements as illustrated herein and adapted for use in a Schmidt projection system.

The manufacture of precision glass optical elements is expensive and time consuming. The grinding and polishing operations necessary to produce smooth optical surfaces are slow and tedious, and are not adaptable to mass production methods. It has heretofore been proposed to form precision optical elements, such as mirrors, by applying a polymerizable composition to a base member preferably formed of a mineral hydrate and having a surface thereon of a contour which approximates the contour of the finished optical surface of the element. The composition is polymerized on the base member in contact with a mold having a smooth optical surface thereon which conforms exactly to the contour of the optical surface of the finished optical element. The polymerizable composition is of such nature that it forms a hard, optically smooth homogeneous surface when polymerized in contact with the mold. Under some conditions, however, checks and cracks appear upon the finished optical surface of the coated element. Such checks and cracks, in some cases, are the result of strains set up in the coating because of the great difference in the linear coefficients of expansion of the mineral hydrate or plaster base and the polymerized coating. The checking and cracking may also be the result of the contraction or shrinking of the polymerizable composition as it is being polymerized. Under other conditions, the polymerizable composition may penetrate excessively into the plaster backing and thus destroy or prevent the formation of a smooth finished optical surface.

One object of the present invention is to provide an improved method of making precision optical elements whereby the above mentioned difficulties will be overcome. To this end, and as illustrated, a partial polymer of a polymerizable composition is applied to the molding surface of a heated mold to form a coating thereon. The mold, with the partially polymerized coating thereon, is subsequently placed in a heated oven until the outer surface of the coating further polymerizes slightly. The coated mold is then removed from the oven and a plaster or other base is placed or formed on the convex coated surface, and the combined base and mold placed in an oven and heated until the plastic coating is completely polymerized.

Still further objects of the invention are to provide improved optical elements and methods of making the same.

Other objects and advantages will in part appear and in part be pointed out in the course of the following descriptions of the invention, which are given as nonlimiting examples in connection with the accompanying drawings in which:

Figure 1 is a schematic view, in section, illustrating one method of applying the fluid coating to the convex surface of a mold member;

Fig. 2 is a view, in section, of a mold member having a coating of partially polymerized material thereon;

Fig. 3 is a sectional view illustrating one form of a backing member to which the coating may be secured;

Fig. 4 is a view, in section, showing the relation between the mold and the backing member with a thin coating of a partially polymerized material interposed therebetween;

Fig. 5 is a sectional view illustrating a finished optical element;

Fig. 6 is an enlarged fragmentary view, in section, of a portion of the backing member having a completely polymerized coating thereon; and Fig. 7 is a sectional view illustrating a method of casting the plaster backing member.

The optical element 10 shown in the drawings, as illustrated best in Fig. 5, is provided with a concave spherical reflecting surface 12. The curvature of this surface however, may be parabolic, hyperbolic, or of any other desired contour or curvature. The present optical element 10 is particularly adapted for use as a reflector in a Schmidt projection system, but it is apparent that it could also be used as a reflector for other purposes. These reflectors vary substantially in size and are usually from 6 to 14 inches in diameter, but they may, in some instances, be as small as two inches in diameter and as large as six or more feet in diameter.

The optical element 10 comprises a rigid base 14 having a concave spherical surface 16 which approximates the contour of the finished reflecting surface 12. The base member 14 is preferably formed of rigid material which is unaffected by the usual temperature changes to which the optical element may be subjected. The base member is preferably formed from material which can be readily cast or molded with the surface 16 thereon approximating the contour of the finished reflecting or optical surface 12 of the element. Materials used for forming the base member are preferably mineral hydrates, such for example as plaster of Paris, Portland cement, and the like. It is evident, however, that other materials may be used, for example, such as metal, glass, or natural stone, such for example, as soap stone. These materials in some instances may be cast or the spherical surface thereon may be formed by a simple grinding operation. If the material from which the base member 14 is made is a mineral hydrate or other material which may be readily molded to shape, it may be precast to form a surface approximating the contour of the finished optical surface of the element or as is preferable, the base member is cast directly on the coating formed on the mold member.

The mold 18 having a convex smooth optically finished surface 20 thereon is formed of glass or other suitable material which may be ground and polished to provide a smooth optically finished molding surface. The mold 18 is coated with a partially polymerized plastic which may be styrene, orthochloro styrene, or other members of the styrene family. Other polymerizable resins may also be used, such as cyclohexyl methacrylate, methyl methacrylate, benzyl methacrylate and copolymers and interpolymers thereof. It is to be expressly understood, however, that all materials are contemplated which may be readily hardened by heat, and which, when hardened in contact with the mold surface 20 form a coating which is hard and homogeneous and form an optically smooth finished surface.

The coating 22 may be applied to the mold by pouring a thin film of partially polymerized styrene over the convex surface thereof and allowing the surplus material to drain off. Preferably, however, the convex surface of the mold 18 is dipped into a bath 24 of partial polymer of styrene, as shown, for example, in Fig. 1. The partial polymer preferably has a viscosity of approximately 10,000 centipoises. The temperature of the mold is approximately 80° C., but it is evident that the temperature of the mold may vary, depending to some extent upon the temperature at which the partial polymer is polymerized. The temperature of the partial polymer can vary substantially, but is usually somewhere within the range of 23° to 80° C. After the convex surface 20 of the mold has been dipped in the bath 24 of the partial polymer, it is removed therefrom and placed with its convex side upwardly to permit the excess partial polymer to drain off, as shown in Fig. 2. With a partial polymer of styrene of the viscosity set forth above and with the temperature of the mold and the temperature of the polymer at about 80° C., the layer of plastic on the convex surface 20 will be approximately .005" thick. If a thicker coating is desired, the viscosity of the partial polymer may be increased by further polymerization or by cooling.

After the mold is covered, or coated, by either of the above methods, it is placed in an oven, heated to approximately 80° C. and baked for approximately 15 minutes to further partially polymerize the styrene and until a thin skin or film is formed on the exposed surface of the polymerizable coating. After this baking operation has been completed, the mold with the coating 22 thereon is removed from the oven and permitted to cool. As shown in Fig. 7, the plaster base 14 may be formed by casting the base from a slurry of plaster of Paris or other similar hydrated material directly on the coated convex surface 20 of the mold 18. A strip 26 of polyvinyl alcohol or Cellophane is wrapped around the upper cylindrical surface of the mold 18 and is held in place by a wrapping of scotch tape 28. This provides a substantially water-tight cavity or receptacle into which a suitable mixture of plaster of Paris or the like may be poured. After the plaster of Paris has set, the mold with the rigid backing thereon is placed in an oven and baked for a period of about 2 hours at a temperature of approximately 80° C. until the partial styrene polymer has been completely polymerized. The mold with the base 14 thereon is then removed from the oven, cooled, and the mold separated from the plastic coated base 14 in the usual manner. After the optical element 10 has been suitably cooled, for example to room temperature, the optical surface 12 thereof is provided with a reflecting coating 30 which may be of silver and which may be deposited thereon in any well-known manner. The reflecting coating 30, however, may also be formed by depositing a thin layer of evaporated aluminum thereon. After the reflecting coating 30 has been suitably polished, the optical element 10 is ready for use.

In some cases it may be desirable to precast the rigid base member or support 15 with a concave surface 16 thereon approximating substantially the contour of the finished optical surface of the element.

Such a precast base member or support 14 is placed on the convex coated surface of the mold in the manner shown in Fig. 4. The thin skin of film which is formed on the above mentioned partial polymerization of the coating prevents the styrene from penetrating into the base member 14 to any substantial extent, such as would prevent formation of a smooth optically finished surface on the coating 22 when the coating 22 is completely polymerized. After the mold 18 and the precast plaster base 14 are assembled, for example, as shown in Fig. 4, they are placed in an oven and baked for approximately 2 hours at a temperature of about 80° C. to completely polymerize the styrene. After this baking process has been completed and the styrene completely polymerized, the mold and the optical elements are gradually cooled and the coated optical element 10 is separated from the mold in the usual manner.

By the use of either of the above mentioned processes, the coating 22 is polymerized and secured to the base 14 in a single operation. Because of the thin skin or film which is formed on the backing, the polymerizable composition does not appreciably penetrate into the backing, thus a coating is formed which is substantially uniform in thickness and which has a hard, smooth polished exposed face.

Since certain changes in the constructions and methods set forth which embody the invention, may be made without departing from its scope, it is intended that all matter contained in the above described specification, or shown in the accompanying drawings, shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An improved method of manufacturing reflecting optical elements which comprises providing a mold member having an optically finished molding surface, coating said optically finished molding surface with a liquid partial polymer of a polymerizable material, advancing the polymerization of the exposed surface of said liquid partial polymer coating to form a thin flexible polymerized skin while retaining the remainder of the partial polymer in liquid condition, applying a porous backing to said polymerized skin, said porous backing being a material chemically inert to and incapable of dissolving said polymerized skin but which will adhere thereto, and completing the polymerization of said liquid partial polymer coating to cause the polymerized coating to be bonded to said backing.

2. An improved method of manufacturing reflecting optical elements which comprises providing a mold member having an optically finished molding surface, coating said optically finished molding surface with a polymerizable liquid material, advancing the polymerization of the exposed surface of said polymerizable liquid coating to form a thin flexible polymerized skin while retaining the remainder of said coating in liquid condition, applying a porous backing to said polymerized skin, said porous backing comprising a material chemically inert to and incapable of dissolving said polymerized skin but which will adhere thereto, and completing the polymerization of said liquid coating to cause the polymerized coating to be bonded to said backing.

3. An improved method of manufacturing reflecting optical elements which comprises providing a mold member having an optically finished molding surface, coating said optically finished molding surface of said mold member with styrene monomer, advancing the polymerization of said styrene monomer coating to form a thin skin of polymerized styrene while retaining the remainder of said coating in liquid condition, applying a porous backing to said polymerized styrene skin to provide a rigid support therefor, said porous backing comprising a material chemically inert to and incapable of dissolving said polymerized skin but which will adhere thereto, and completing the polymerization of said styrene coating to cause the polymerized coating to be bonded to said backing.

4. An improved method of manufacturing reflecting optical elements which comprises providing a mold member having an optically finished molding surface, coating said optically finished molding surface of said mold member with a liquid partial polymer of styrene, advancing the polymerization of said styrene coating to form a thin skin of polymerized styrene while retaining the remainder of said coating in liquid condition, applying a porous backing to said polymerized styrene skin to provide a rigid support therefor, said porous backing comprising a material chemically inert to and incapable of dissolving said polymerized skin but which will adhere thereto, and completing the polymerization of said partial polymer of styrene to cause the polymerized coating to be bonded to said backing.

5. An improved method of manufacturing reflecting optical elements which comprises providing a mold member having an optically finished molding surface, coating said optically finished molding surface of said mold member with a liquid partial polymer of styrene, advancing the polymerization of said styrene coating to form a thin skin of polymerized styrene while retaining the remainder of said coating in liquid condition, casting a porous backing on said polymerized styrene skin to provide a rigid support therefor, said porous backing comprising a material chemically inert to and incapable of dissolving said polymerized skin but which will adhere thereto, and completing the polymerization of said partial polymer coating to cause the polymerized coating to be bonded to said backing.

6. An improved method of manufacturing reflecting optical elements which comprises providing a mold member having an optically finished molding surface, coating said optically finished molding surface with a polymerizable liquid material, advancing the polymerization of the exposed surface of said polymerizable liquid coating to form a thin flexible polymerized skin while retaining the remainder of said coating in liquid condition, casting a porous backing on said polymerized skin, said porous backing comprising a material chemically inert to and incapable of dissolving said polymerized skin but which will adhere thereto, and completing the polymerization of said liquid coating to cause the polymerized coating to be bonded to said backing.

7. An improved method of manufacturing reflecting optical elements which comprises providing a mold member having an optically finished molding surface, coating said optically finished molding surface of said mold member with a liquid partial polymer of styrene, advancing the polymerization of said styrene coating to form a thin skin of polymerized styrene while retaining the remainder of said coating in liquid condition, casting a slurry of mineral hydrate on said polymerized skin, said mineral hydrate being chemically inert to and incapable of dissolving said polymerized skin but being capable of adhering thereto, causing said mineral hydrate slurry to set to form a porous backing, and completing the polymerization of said partial polymer of styrene to cause the polymerized coating to be bonded to said backing.

8. An improved method of manufacturing reflecting optical elements which comprises providing a mold member having an optically finished molding surface, coating said optically finished molding surface of said mold member with a liquid partial polymer of styrene, advancing the polymerization of said styrene coating to form a thin skin of polymerized styrene while retaining the remainder of said coating in liquid condition, casting a slurry of plaster of Paris and water on said polymerized skin, causing said plaster of Paris slurry to set to form a porous backing, and completing the polymerization of said partial polymer of styrene to cause the polymerized coating to be bonded to said backing.

9. An improved method of manufacturing reflecting optical elements which comprises providing a mold member having an optically finished molding surface, coating said optically finished molding surface of said mold member with a liquid partial polymer of styrene, advancing the polymerization of said styrene coating to form a thin skin of polymerized styrene while retaining the remainder of said coating in liquid condition, applying a porous preformed backing to said polymerized styrene skin to provide a rigid support therefor, said porous backing comprising a material chemically inert to and incapable of dissolving said polymerized skin but which will adhere thereto, and completing the polymerization of said partial polymer of styrene to cause the polymerized coating to be bonded to said backing.

10. An improved method of manufacturing reflecting optical elements which comprises providing a mold member having an optically finished molding surface, coating said optically finished molding surface with a polymerizable liquid material, advancing the polymerization of the exposed surface of said polymerizable liquid coating to form a thin flexible polymerized skin while retaining the remainder of said coating in liquid condition, applying a porous preformed backing to said polymerized skin, said porous backing comprising a material chemically inert to and incapable of dissolving said polymerized skin but which will adhere thereto, and completing the polymerization of said liquid coating to cause the polymerized coating to be bonded to said backing.

11. An improved method of manufacturing reflecting optical elements which comprises providing a mold member having an optically finished molding surface, coating said optically finished molding surface with a liquid partial polymer of styrene, advancing the polymerization of said styrene coating to form a thin skin of polymerized styrene while retaining the remainder of said coating in liquid condition, applying a preformed plaster of Paris backing to said partially polymerized coating, and completing the polymerization of said partial polymer of styrene to cause the polymerized coating to be bonded to said plaster of Paris backing.

JOHN H. RICHARDSON.

REFERENCES CITED

The following references are of record in the file of this patent:

UNITED STATES PATENTS

| Number | Name | Date |
| --- | --- | --- |
| 1,094,828 | Aylesworth | Apr. 28, 1914 |
| 2,313,985 | Bradshaw | Mar. 16, 1943 |
| 2,339,433 | Staehle | Jan. 18, 1944 |
| 2,369,758 | Sheldon | Feb. 20, 1945 |

FOREIGN PATENTS

| Number | Country | Date |
| --- | --- | --- |
| 482,836 | Great Britain | Apr. 5, 1938 |